(12) United States Patent
Tsudik et al.

(10) Patent No.: US 8,710,952 B2
(45) Date of Patent: Apr. 29, 2014

(54) RFID READER REVOCATION CHECKING USING LOW POWER ATTACHED DISPLAYS

(75) Inventors: Gene Tsudik, Irvine, CA (US); Ersin Uzun, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 690 days.

(21) Appl. No.: 12/876,832

(22) Filed: Sep. 7, 2010

(65) Prior Publication Data
US 2011/0057770 A1 Mar. 10, 2011

Related U.S. Application Data

(60) Provisional application No. 61/240,432, filed on Sep. 8, 2009.

(51) Int. Cl.
*G05B 19/00* (2006.01)
*H04L 29/06* (2006.01)

(52) U.S. Cl.
USPC .......... 340/5.2; 340/5.22; 340/5.28; 713/151; 713/155; 713/156

(58) Field of Classification Search
None
See application file for complete search history.

(56) References Cited

U.S. PATENT DOCUMENTS

| | | | |
|---|---|---|---|
| 2003/0097304 A1* | 5/2003 | Hunt | 705/22 |
| 2005/0144437 A1* | 6/2005 | Ransom et al. | 713/151 |
| 2005/0246292 A1* | 11/2005 | Sarcanin | 705/67 |
| 2007/0052523 A1* | 3/2007 | Jin et al. | 340/10.2 |
| 2007/0069851 A1* | 3/2007 | Sung et al. | 340/5.1 |
| 2008/0094215 A1* | 4/2008 | Amador et al. | 340/572.1 |
| 2008/0144829 A1* | 6/2008 | Mitsuoka et al. | 380/270 |
| 2008/0164976 A1* | 7/2008 | Griffiths-Harvey et al. | 340/10.1 |
| 2008/0165005 A1* | 7/2008 | Burbridge et al. | 340/572.1 |
| 2008/0246611 A1* | 10/2008 | King et al. | 340/572.3 |
| 2009/0136027 A1* | 5/2009 | Salowey et al. | 380/45 |
| 2009/0210702 A1* | 8/2009 | Welingkar et al. | 713/156 |
| 2009/0278664 A1* | 11/2009 | Jin et al. | 340/10.1 |
| 2010/0007466 A1* | 1/2010 | Shoarinejad et al. | 340/10.1 |
| 2010/0045442 A1* | 2/2010 | Lu et al. | 340/10.3 |
| 2010/0109852 A1* | 5/2010 | Bauchot et al. | 340/10.51 |
| 2010/0159986 A1* | 6/2010 | Lewis et al. | 455/557 |
| 2010/0201489 A1* | 8/2010 | Griffin | 340/10.1 |

* cited by examiner

*Primary Examiner* — George Bugg
*Assistant Examiner* — Renee Dorsey
(74) *Attorney, Agent, or Firm* — Marcus C. Dawes; Daniel L. Dawes

(57) ABSTRACT

A method of authenticating a radio frequency identification (RFID) reader to efficiently and timely check of revocation status of the RFID reader includes the steps of checking whether a given certificate is expired or revoked, and allowing a user of an RFID tag to verify that the credentials and revocation status information reported to the tag by reader is correct and current/valid before permitting information transmission from the RFID tag to the reader. An RFID tag includes a passively powered display and a user activatable control which allows the method to be carried out with the tag. The tag may include encrypted communication ability and automatic certificate revocation list checking. (This method is applicable not just to RFID but to any technology involving purely passive operation, i.e., where the tag obtains power from a reader).

17 Claims, 1 Drawing Sheet

US 8,710,952 B2

RFID READER REVOCATION CHECKING USING LOW POWER ATTACHED DISPLAYS

RELATED APPLICATIONS

The present application is related to U.S. Provisional Patent Application Ser. No. 61/240,432, filed on Sep. 8, 2009, which is incorporated herein by reference and to which priority is claimed pursuant to 35 USC 119.

STATEMENT OF GOVERNMENT SUPPORT

This invention was made with government support under grant 0831526 awarded by the National Science Foundation. The government has certain rights in the invention.

BACKGROUND OF THE INVENTION

1. Field of the Invention

The invention relates to the field of passive radio frequency identification (RFID) (or any other purely passive technology) tags wherein certificate revocation status and expiration checking needs to be performed.

2. Description of the Prior Art

Radio Frequency Identification (RFID) is a wireless technology mainly used for identification of various types of objects, e.g, merchandise. A passive RFID tag has no power source of its own. Information stored on an RFID tag can be read by special devices called RFID readers 12, from some distance away and without requiring line-of-sight alignment.

The cost and capabilities of an RFID tag vary widely depending on the target application. At the high end of the spectrum, the tags used in e-Passports, electronic ID (e-ID) Cards, e-Licenses, and contactless payment instruments, tags may be powerful enough to perform public key cryptographic operations.

With the introduction of RFID tags that are capable of computing public key based cryptographic functions, the security in these systems rely on public key certificates issued by certification authorities (CAs). One of the main challenges in public key infrastructure based RFID systems is revocation checking. Contrary to the assumptions of well0known traditional methods such as certificate revocation lists (CRL) or online protocols, RFID tags have very limited storage, are incapable of maintaining an internal clock and may not have access to an online communication channel to an authority. Practical deployments of public key cryptography usually involve public key infrastructures (PKIs). In a typically PKI, a certificate revocation list (CRL) is a list of certificates (or more specifically, a list of serial numbers for certificates) that have been revoked or are no longer valid, and therefore should not be trusted.

The main challenge in solving the revoked or expired reader certificate problem in RFID systems is due to the fact that RFID tags are passive devices without any self-sustaining power source. In other words, RFID tags are only alive when they are being read and they solely depend on the readers for their view of world (e.g., current time and date). However, this makes the revocation of readers challenging as the RFID tag relies on the reader itself to supply the ostensibly current date/time and be sure that, during reading, the presented reader certificate is not expired and it is not listed in the up-to-date revocation list. This opens the door for revoked reader attacks, since an expired certificate and/or an old certificate revocation list (CRL) would not be noticed by a tag, as long as the reader reports a time in history where both the certificate and the CRL was valid as the current time to the tag.

The prior art attempted to solve this problem in the context of e-passport specifications documents. See Bundesamt fur Sicherheit in der Informationstechnik: Advanced Security Mechanisms for Machine Readable Travel Documents Version 2.0. (2008) and International Civil Aviation Organization: Machine Readable Travel Documents: Specifications for Electronically Enabled Passports with Biometric Identification Capability. (2006). However, as discussed below, the merit of the methods introduced in those documents is limited to shrinking the window of vulnerability without actually solving the problem. Although many previous publications have acknowledged the problem, there has been no solution offered.

BRIEF SUMMARY OF THE INVENTION

One important distinction between the use of very low cost RFID tags and the tags used in user authentication, facility access control or payment applications is that the tag is accompanied by a human user in latter applications. The solution presented in this disclosure uses this fact to build an efficient, feasible, and simple solution for reader certificate revocation and expiration checking on RFID tags (or any other purely passive contactless technology). By involving the user into the authentication protocol, the disclosed solution introduces a new way for reader revocation and expiration checking on RFID tags. It requires only a fixed amount of communication between a tag and reader, does not assume any online connectivity to an authority and the storage needed on tag and the reader is kept constant. On the other hand, the disclosed solution requires a small (at least 4-5 digits) display on RFID tags.

The illustrated embodiment solves the reader certificate expiration and revocation problem that is left unsolved by the prior art. Compared to prior art, this invention provides solid and quantifiable security guarantees for a given time CRL issuance interval. In the illustrated embodiment of the invention, we disclose a method of authenticating RFID readers which allows efficient and timely check of revocation status in the process. The two characteristics of the illustrated embodiment compared to the existing techniques are two-fold: (1) an efficient way for RFID tags to check whether a given reader certificate is still valid (it is not revoked or expired). (2) a new protocol that allows the owner of an RFID tag to verify that their tags do not disclose any information to readers with revoked or expired credentials. We achieve these advantages by using hash chains and cryptographic signatures and attaching a low power, flexible and ultra-thin display to the RFID tag, which can easily be powered by the energy absorbed via a RFID antenna without a need for any secondary power source or change in current RFID specifications.

Compared to traditional CRLs and certificate revocation trees (CRTs), which require an order of O(n) and O(log(n)) of communication overhead and storage respectively, the illustrated (preferred) embodiment has a constant or fixed communication overhead between the tag and the reader. (However, proposed method can be also used with CRLs, CRTs and variants thereof).

The illustrated embodiment can be used in many domains where RFID tags carry private or valuable information. Immediate examples for such uses are RFID-equipped passports and credit/debit cards. Users include national and international governmental, agencies responsible for border protection and travel document issuance, banks, credit card companies and companies producing equipment for RFID-based access control systems.

More particularly, the illustrated embodiments include a method to perform an efficient and timely check of the expiration and/or revocation status of the RFID reader's certificate comprising the steps of checking whether a given certificate is not expired or revoked, and allowing a user of an RFID tag to verify that the certificate and revocation status information reported to the tag by reader is current and correct before permitting information transmission from the RFID tag to the reader. It is to be expressly understood throughout the specification and claims that the scope of the invention includes any contactless and passive technology and is not limited to RFID technologies.

The step of checking whether a given certificate is revoked (or expired)=comprises the step of using hash chains and cryptographic signatures.

The step of allowing a user of an RFID tag to verify that the certificate and revocation data reported to the tag by reader is correct and current comprises the step of attaching a low power display to the RFID tag to display the lesser of the revocation information and the certificate expiration date, powered by energy absorbed via an RFID antenna without a need for any secondary power source or change in RFID specifications, and executing normal operation procedures or initiating an escape action depending on whether the certificate and the revocation information presented by the reader is timely or not, respectively.

The method further comprises the step of using a constant or fixed communication overhead between the tag and the reader.

The steps of checking and allowing are performed with RFID tags which carry security, private or valued information. Valued information is meant to include, but is not limited to, financial information relating to a transaction and/or a chargeable account which can be accessed for a transaction.

The steps of checking and allowing are performed with RFID equipped passports, or documents used: by national or international governmental agencies responsible for border protection or travel document issuance, by banks, by credit card companies or by companies producing equipment for RFID based access control systems.

The illustrated embodiments of the invention also include a system for authenticating a radio frequency identification (RFID) reader to efficiently and timely check of revocation status of the RFID reader comprising a circuit for checking whether a given certificate is revoked or not and for allowing a user of an RFID tag to verify that the current date reported to the tag by the reader is correct before permitting information transmission from the RFID tag to the reader.

The circuit for checking whether a given certificate is revoked or not comprises a circuit for using hash chains and cryptographic signatures.

The RFID tag has an RFID antenna and the circuit for allowing a user of an RFID tag to verify that the revocation status information and the public key certificate reported to the tag by reader is current comprises a low power display included in the RFID tag to display the lesser of the revocation status information and the certificate expiration date, the RFID tag being powered by energy absorbed via the RFID antenna without a need for any secondary power source or change in RFID specifications, so that normal operation procedures or an escape action is initiated depending on whether CRL expiration date of the reader is correct or not, respectively.

The circuit for checking and allowing are usable with RFID tags which carry private or valued information.

The circuit for checking and allowing is usable with RFID equipped passports, or documents used: by national or international governmental agencies responsible for border protection or travel document issuance, by banks, by credit card companies or by companies producing equipment for RFID based access control systems.

The illustrated embodiments of the invention further include an RFID tag comprising a passively powered processing circuit for storing and communicating encrypted information, a portable package including the processing circuit, the package capable of being personally ported by an individual, a control included in the package wherein user/owner activation is required for transmission of information stored in the processing circuit, and a passively powered display included in the package coupled to the processing circuit.

The display is capable of displaying digits.

The RFID tag is used in combination with a reader and the processing circuit receives from the reader a PKC along with a signed and time-stamped proof of non-revocation and where the processing circuit is operable to verify the respective signatures on the reader's PKC and the non-revocation proof, and to provide on the display the lesser of: PKC expiration time and non-revocation proof expiration time.

The selective activation of the control by a user causes the processing circuit to initiate an escape action with the reader or to proceed with a normal operation with the reader.

The RFID tag is used in combination with a reader and the processing circuit is arranged and configured to automatically check certificate revocation of the reader.

The illustrated embodiments of the invention still further include an RFID tag attended by an individual for use in combination with a reader comprising a display capable of showing a date, a control for making the tag temporarily inaccessible to the reader, a memory which has stored therein a name and a public key of a system-wide certification authority (CA), which periodically issues an updated revocation structure, which has stored therein a periodicity of revocation issuance by the certification authority (CA), and which has stored therein the last valid date the tag encountered, a calculator to calculate an expiration date of revocation status information by knowing its issuance date, and a count-down timer.

The display, calculator and count-down timer are passively powered.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

Figure 1:
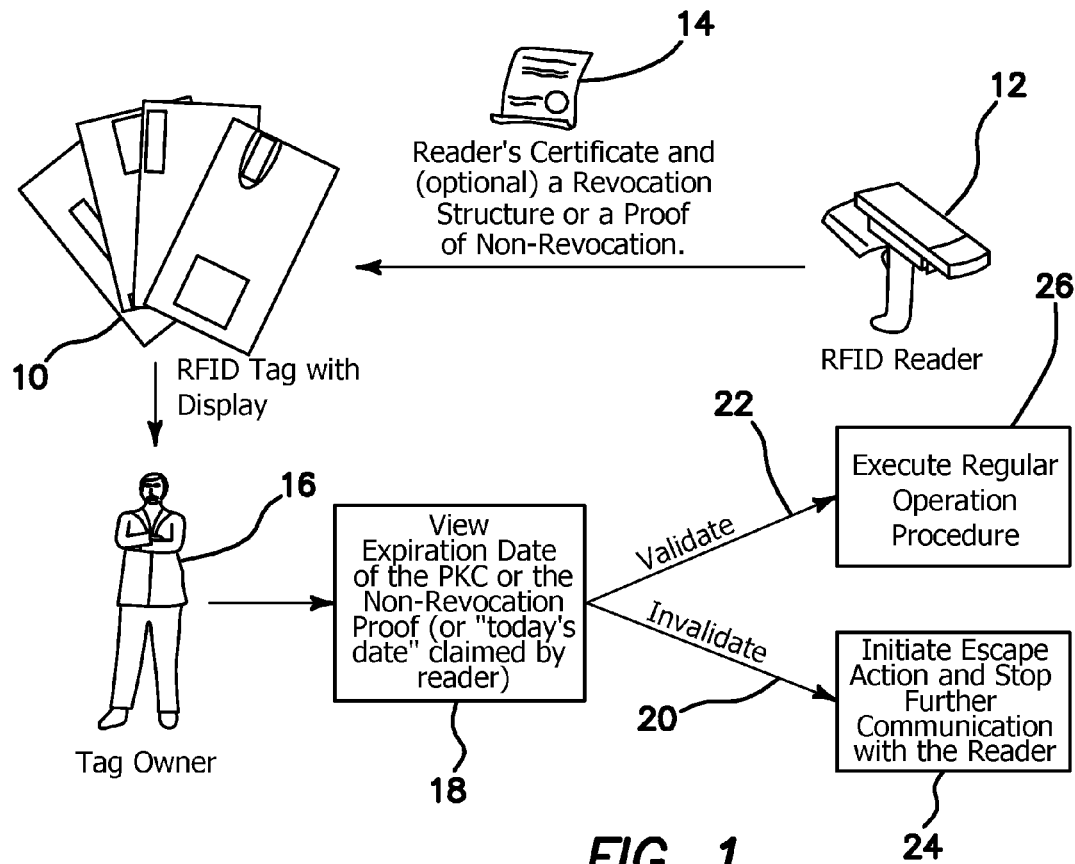
FIG. 1 is a simplified diagram of the method of operation of the illustrated embodiment of the invention.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

One common and central purpose of all RFID tags and systems is to enable tag identification (at various levels of granularity) by readers. With that in mind, many protocols have been proposed to protect the identification process (i.e., the tag-reader dialog) from a range of attacks. In systems where tags cannot perform cryptographic operations or where they are limited to symmetric cryptography, reader revocation is not an issue, since it is essentially impossible. Whereas, in the context of public key-enabled tags, reader revocation is both imperative and possible, as we show later in this disclosure. It is imperative, because not doing it prompts some serious threats. For example, consider the following events: a reader is lost, stolen, compromised (perhaps without its owner's knowledge), or decommissioned. In all of these cases, if it cannot be revoked effectively, a reader that has fallen into the wrong hands can be used to identify and track tags. In case of personal tags {e.g., ePassports, credit-cards or e-IDs} other threats are possible, such as identity theft or credit card fraud.

Thus far, it might seem that our motivation is based solely on the need to detect explicitly revoked reader certificates. "Explicitly" here means before the expiration of the PKC. However, what if a reader certificate naturally expires? This indicates implicit revocation and a well-behaved reader would not be operated further until a new certificate is obtained. However, if a reader (or rather its owner) is not well-behaved, it might continue operation with an expired certificate. Without checking certificate expiration, an unsuspecting tag could be tricked into identifying itself and possibly divulging other sensitive information. In the remainder of this disclosure, we make no distinction between explicit revocation (i.e., revocation before expiration) and implicit revocation (i.e., certificate expiration) checking. The reason is that both tasks are essential for security and both require current time.

When presented with a PKC of a reader, a tag needs to check three things: (1) signature of the issuing certification authority (CA), (2) expiration and (3) revocation status. The first is easy for any public key-enabled (pk-enabled) tag and has been already incorporated into some prior art reader authentication schemes. However, tasks (2) and (3) are problematic. Note that even a high-end tag is a passive device lacking a clock. Thus, a tag, by itself, has no means of deciding whether a presented certificate is expired.

Revocation checking is even more challenging. First, similar to expiration, off-line revocation checking (e.g., CRL-based) requires current time because the tag needs to check the timeliness of the presented proof of non-revocation. Also, communicating a proof of non-revocation entails extra bandwidth from the reader to the tag. For CRLs, the bandwidth is O(n) and, for more efficient certificate revocation trees (CRTs), the bandwidth is O(log n) {a non-negligible number for large values of n, where n is the number of revoked readers}. Whereas, online revocation checking protocols (such as online certificate status protocol {OSCP}) offer constant-size proofs of non-revocation. However, such protocols are unsuitable due to their connectivity and availability requirements.

In the illustrated embodiments of the invention we focus on a class of public key enabled (pk-enabled) RFID systems where tags are both personal and attended. This includes e-Passports, e-Licenses and contactless credit cards. "Personal" means that a tag belongs to a human user and "attended" means that a tag is supposed to be activated only with that user's (owner's) consent. Our approach is based on several observations:

User/owner presence and (implicit) consent are already required for the tag to be activated.

Low-cost and low-power flexible display technology is a reality, e.g., e-disclosure and organic light emitting diode (OLED). In fact, passive RFID tags with small (6-10 digit) displays have been demonstrated and are currently feasible.

Since certificate revocation and expiration granularity is usually relatively coarse-grained (i.e., days or weeks, but not seconds or minutes), users can distinguish between timely and stale date/time values.

As shown in the diagrammatic depiction of FIG. 1: a display-equipped tag 10 receives, from a reader 12, a PKC along with a signed and time-stamped proof of non-revocation (CRL 14). After verifying the respective signatures on the reader's PKC and the non-revocation proof, the tag 10 displays the lesser of: (1) PKC expiration time and (2) non-revocation proof expiration time. The user 16, who is assumed to be reasonably aware of current time, validates the timeliness of the displayed time at step 18. If it is deemed to be stale, the user 16 aborts the interaction at step 20 with the reader 12 to initiate an escape action at step 24. Otherwise, user 16 allows the interaction at step 22 to proceed with a regular or normal operation procedure at step 26.

We re-emphasize that our approach is aimed at pk-based RFID systems. It has one simple goal: secure and reliable revocation checking on RFID tags 10. Our design entails the following assumptions. Although we use "date" as the revocation/expiration granularity, the disclosed technique is equally contemplates both coarser- and finer-granular measures, e.g., month or hour.

i. Each tag 10 is owned and physically attended by a person who understands tag operation and who is reasonably aware of the current date.
  ii. Each tag 10 is equipped with a one-line alpha-numeric display 30 capable of showing a date.
  iii. Each tag 10 has a mechanism that allows it to become temporarily inaccessible to the reader 12.
  iv. Each tag 10 is aware of the name and the public key of a system-wide trusted certification authority (CA).
  v. The CA is assumed to be infallible: anything signed by the CA is guaranteed to be genuine and error-free.
  vi. The CA issues an updated revocation structure (e.g., a CRL) periodically. It includes serial numbers of all revoked reader certificates.
  vii. Each tag 10 knows the periodicity of revocation issuance (i.e., it can calculate the expiration date of revocation status information by knowing its issuance date.)
  viii. While powered up by a reader 12, a tag 10 is capable of maintaining a count-down timer.
  ix. A tag 10 can retain (in its non-volatile storage) the last valid date it encountered.
  x. Optionally, a tag 10 may have a single button 28 for user input.

Figure 2:
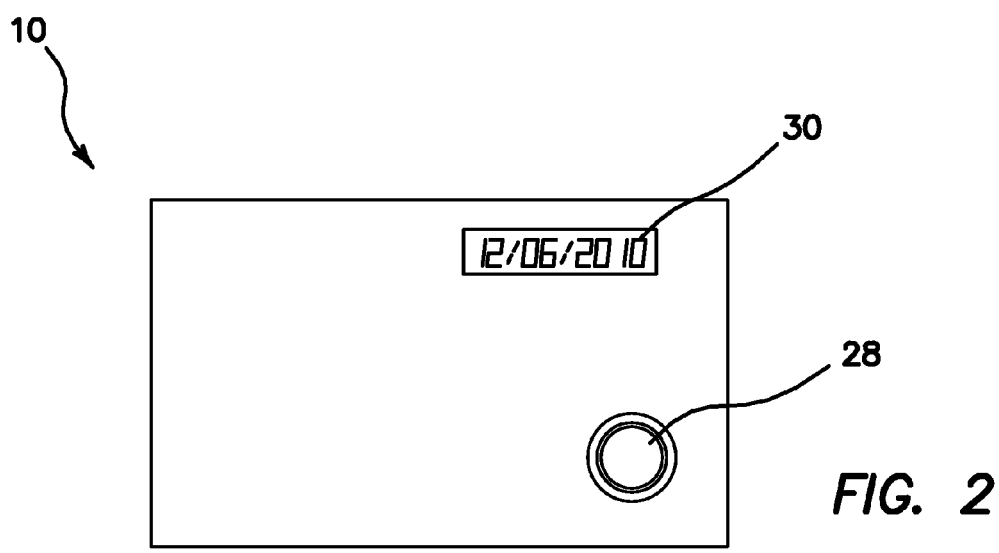
FIG. 2 is a display and button equipped RFID tag as employed in one embodiment of the invention.

An example of a tag 10 as contemplated in the illustrated embodiment is shown diagrammatically in FIG. 2.

Before providing further information with respect to the reader 12, a tag 10 has to validate the reader PKC. Recall our assumption that the user 16 is physically near (e.g., holds) his tag 10 during the entire process. Verification is done as follows:

i. The freshly powered-up tag 10 receives the certificate revocation structure (CRS) and the reader PKC. Let $CRS_{iss}$, $CRS_{exp}$, $PKC_{iss}$ and $PKC_{exp}$ denote issuance and expiration times for purported CRS and PKC, respectively. If the tag is equipped with a non-volatile read/write memory, date register, then let the last valid date stored in the tag 10 be $Tag_{Curr}$.

ii. If $CRL_{iss} \geq PKC_{exp}$, the tag 10 aborts. If tag has date register and either $CRL_{exp}$ or $PKC_{exp}$ is smaller than $Tag_{Curr}$, the tag 10 aborts.

iii. The tag 10 checks whether the CRL includes the serial number of the reader certificate. If so, it aborts.

iv. The tag 10 checks the CA signatures of the PKC and CRL. If either check fails, the tag 10 aborts.

v. If tag has a date register and if $CRL_{iss}$ or $PKC_{iss}$ is more recent than the currently stored date, $Tag_{Curr}$, the tag 10 updates $Tag_{Curr}$ to the more recent of the two.

vi. The tag 10 displays the lesser of the $CRL_{exp}$ and $PKC_{exp}$. It then enters a countdown stage of fixed duration (e.g., 10 seconds).

vii. The user 16 views the date on the display 30. [OPTION A:] (a) If the displayed date is not in the past, the user 16 does nothing and interaction between the tag 10 and the reader 12 resumes after the countdown stage. (b) Otherwise, the user 16 terminates the protocol by initiating an escape action while the tag 10 is still in countdown stage. [OPTION B:] (If tag is equipped with a button) (a) If the displayed date is in the future, the user 16 presses the button 28 on the tag 10 before the timer runs out, and communication with the reader 12 continues normally. (b) Otherwise, the timer runs out and the tag 10 automatically aborts the protocol.

Another alternative to the above described solution is as follows:

i. The freshly powered-up tag 10 receives the certificate revocation structure (CRS), the reader PKC and the claimed current date, $T_{Curr}$, from the reader. Let $CRS_{exp}$ and $PKC_{exp}$ denote expiration times for purported CRS and PKC, respectively. If the tag is equipped with a non-volatile read/write memory, date register, then let the last valid date stored in the tag 10 be $Tag_{Stored}$.

ii. If $CRL_{iss} \geq PKC_{exp}$, or $T_{Curr} > PKC_{exp}$, or $T_{Curr} > CRS_{exp}$, the tag 10 aborts. If tag has date register and $T_{Curr} < Tag_{Stored}$, the tag 10 aborts.

iii. The tag 10 checks whether the CRL includes the serial number of the reader certificate. If so, it aborts.

iv. The tag 10 checks the CA signatures of the PKC and CRL. If either check fails, the tag 10 aborts.

v. If tag has a date register and if $CRL_{iss}$ or $PKC_{iss}$ is more recent than the currently stored date, $Tag_{Stored}$, the tag 10 updates $Tag_{Stored}$ to the more recent of the two.

vi. The tag 10 displays $T_{Curr}$. It then enters a countdown stage of fixed duration (e.g., 10 seconds).

vii. The user 16 views the date on the display 30. [OPTION A:] (a) If the displayed date is today's date, the user 16 does nothing and interaction between the tag 10 and the reader 12 resumes after the countdown stage. (b) Otherwise, the user 16 terminates the protocol by initiating an escape action while the tag 10 is still in countdown stage. [OPTION B:] (If tag is equipped with a button) (a) If the displayed date is correct, the user 16 presses the button 28 on the tag 10 before the timer runs out, and communication with the reader 12 continues normally. (b) Otherwise, the timer runs out and the tag 10 automatically aborts the protocol.

Depending on the application and available hardware on a tag, a button 28 in described solutions can easily be replaced with a keypad, microphone, accelerometer or any other user input interface, as long as it allows a user 16 to signal his/her acceptance or rejection to the tag.

Turn now to the escape actions. As evident from the above, an escape action is required whenever the user 16 decides that the displayed date is stale. Although the choice of an escape action is likely to be application-dependent, we sketch out several simple and viable examples. A first action may involve using a button 28. Recent developments in low-power hardware integration on contactless cards have led to deployment of buttons on RFID tags 10. On such tags 10, the user 16 can be asked to press a button 28 (within a fixed interval) as a signal of acceptance. For tags 10 that have no buttons but built-in accelerometers, gestures can also be used to signal user acceptance. If the button 28 is not pressed within that interval, the protocol is automatically terminated by the tag 10. Thus, the escape action in this case involves no explicit action by the user 16.

Turn to consider an escape action involving a Faraday cage. A Faraday cage is a jacket made of highly conductive material that blocks external electric fields from reaching the device it encloses. Since tags 10 are powered by the electric field emitted from a reader 12, it is theoretically possible to isolate them from all reader access by simply enclosing them in a Faraday cage. For tags 10 that have an enclosing Faraday cage {such as e-Passports that have one inside their cover pages {the natural escape action is simply closing the passport.

Turn to consider an escape action involve disconnecting antennas. An RFID tag 10 communicates and receives power through a coil antenna attached to its chip. Disconnecting the antenna from the chip immediately halts communication and shuts down the tag 10. A simple physical switch placed between a tag 10 and its antenna can be used as an escape action. Similar mechanical actions aimed to halt communication between a tag 10 and a reader 12 are described in G. Karjoth and P. A. Moskowitz. Disabling RFID tags with visible confirmation: clipped tags are silenced, In Workshop on Privacy in the Electronic Society, WPES, 2005.

Turn now to the issue of efficient revocation checking. Our approach would work with CRLs, CRTs or any other off-line revocation scheme. However, both CRLs and CRTs become inefficient as the number of revoked readers 12 increases. CRLs are linear and CRTs logarithmic, in the number of revoked certificates. Our goal is to minimize bandwidth consumed by revocation information by making it constant, i.e, O(1). To achieve this, we take advantage of a previously proposed modified CRL technique originally intended to provide privacy-preserving revocation checking as described in M. Narasimha, J. Solis, and G. Tsudik. Privacy preserving revocation checking, International Journal of Information Security, 8(1):61 {75, February 2009.

In more detail, the modified CRL technique works as follows: assume that the CRL is sorted in ascending order by the revoked certificate serial numbers. For a CRL with n entries, the CA generates a signature for the i-th entry (1<i fi n) as follows:

$$\text{Sign}(i) = \{h(CRL_{iss}||SN_i||SN_{i-1})\}_{SKRA}$$

where, $CRL_{iss}$ is the issuance date of this current CRL, $SN_i$ is the i-th certificate serial number on the ordered CRL, $SN_{i-1}$ is the immediately preceding revoked serial number, SKRA is the secret key of the CA and h is a suitable cryptographic hash function. To mark the beginning and the end of a CRL, the CA uses two fixed sentinel values: $+\infty$ and $-\infty$.

When authenticating to a tag 10, a non-revoked reader 12 provides its own PKC as well as the following constant-size non-revocation proof:

$$SN_j; SN_{j-1}; CRL_{iss}; Sign(j)$$

where reader certificate serial number $SN_{rdr}$ is such that $SN_{j-1} < SN_{rdr} < SN_j$. The reader PKC, along with the above information, allows the tag 10 to easily check that: (1) the range between adjacent revoked certificate serial numbers contains the serial number of the reader PKC, and (2) the signature Sign(j) is valid. If both are true, the tag 10 continues with the protocol by displaying the lesser of the $CRL_{exp}$ and $PKC_{exp}$, as in step 6 above.

Compared with traditional CRLs, this scheme reduces both storage and communication overhead from O(n) to O(1) for both, readers 12 and tags 10. On the other hand, the CA has to separately sign each CRL entry. Although this translates into significantly higher computational overhead for the CA, we note that CAs are powerful entities running on resource-rich systems and CRLs are not usually reissued very frequently, i.e., weekly or daily, but not every minute or even every hour.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention

We claim:

1. A method of authenticating a certificate of a passive and contactless reader to perform an efficiently and timely revocation and/or expiration status check of the reader certificate, comprising:
    machine checking whether the certificate is on a certificate revocation list (CRL) or a similar structure or not by using a processing circuit disposed in a tag;
    displaying a date related to the expiration of the certificate or the expiration of the period for non-revocation of the certificate to a user on the tag; and
    contingently permitting information transmission from the tag to the reader by allowing the user of the tag to verify that the certificate expiration is in the future and the certificate revocation status reported to the tag by the reader is current.

2. The method of claim 1 where machine checking whether a given certificate is on a CRL or not comprises using hash chains and cryptographic signatures.

3. The method of claim 1 where the tag comprises an RFID tag and the reader comprises an RFID reader and where displaying a date to a user comprises providing a low power display on the RFID tag, powered by energy absorbed via an RFID antenna without a need for any secondary power source or change in RFID specifications, and where contingently permitting information transmission from the RFID tag to the RFID reader comprises executing normal operation procedures or initiating an escape action contingent on whether credentials of the reader are still valid (not expired) and the revocation information is current or not, respectively.

4. The method of claim 1 further comprising using a predetermined communication overhead between the tag and the reader.

5. The method of claim 1 where the steps of machine checking and contingently permitting information transmission from the tag to the reader are performed with tags which carry private or valued information.

6. The method of claim 5 where the steps of machine checking and contingently permitting information transmission from the tag to the reader are performed with contactless-equipped documents, badges or payment instruments used by national or international governmental agencies responsible for border protection or travel document issuance, by banks, by credit card companies or by companies producing equipment for RFID based access control systems.

7. A system for authenticating a radio frequency identification (RFID) reader to efficiently and timely check of revocation status of the RFID reader comprising:

circuit means disposed in a RFID tag for machine checking whether a given certificate is on a certificate revocation list (CRL) or not; and a display disposed on the RFID tag for allowing a user of the RFID tag to verify that the credentials reported to the tag by the RFID reader is current and not revoked before permitting electronic information transmission from the RFID tag to the RFID reader.

8. The system of claim 7 where the circuit means for checking whether a given certificate is on a CRL or not comprises a processing circuit using hash chains and cryptographic signatures.

9. The system of claim 7 where the RFID tag has an RFID antenna and where the display disposed on the RFID tag for allowing a user of the RFID tag to verify that certification status information reported to the tag by reader is correct comprises a low power display included in the RFID tag to display a date, the RFID tag being powered by energy absorbed via the RFID antenna without a need for any secondary power source or change in RFID specifications, so that normal operation procedures or an escape action is initiated depending on whether the credentials of the reader is current and valid or not, respectively.

10. The system of claim 7 where the circuit means for checking and display are usable with tags which carry private or valued information.

11. The system of claim 10 where the circuit means for checking and display are usable with contactless equipped documents, payment instruments or badges used: by national or international governmental agencies responsible for border protection or travel document issuance, by banks, by credit card companies or by companies producing equipment for RFID based access control systems.

12. An RFID tag comprising:
a passively powered processing circuit for storing and communicating encrypted information;
a portable package including the processing circuit, the package capable of being personally ported by an individual;
a passively powered display coupled to the processing circuit and disposed on the RFID tag,
wherein the RFID tag is in combination with a reader where the processing circuit receives from the reader a public key certificate (PKC) along with a signed and time-stamped proof of non-revocation and where the processing circuit is operable to verify the respective signatures on the reader's PKC and the non-revocation proof, and to provide on the display disposed on the RFID tag either the date reported as current by the reader or the lesser of PKC expiration time or non-revocation proof expiration time.

13. The RFID tag of claim 12 where the display disposed on the RFID tag is capable of displaying digits or alphabetical characters.

14. The RFID tag of claim 12 where selective activation of the control by a user causes the processing circuit to initiate an escape action with the reader or to proceed with a normal operation with the reader.

15. The RFID tag of claim 12 in combination with an RFID reader where the processing circuit is arranged and configured to automatically check certificate expiration and/or revocation of the reader.

16. An RFID tag attended by an individual for use in combination with an RFID reader, the RFID tag comprising:
a display capable of showing a date;
a control for making the tag temporarily inaccessible to the reader;
a calculator to calculate an expiration date of revocation status information by knowing its issuance date; and
a count-down timer,
wherein the RFID tag is in combination with a reader where the control receives from the reader a public key certificate (PKC) along with a signed and time-stamped proof of non-revocation and where the control is operable to verify the respective signatures on the reader's PKC and the non-revocation proof, and to provide on the display disposed on the RFID tag either the date reported as current by the reader or the lesser of PKC expiration time or non-revocation proof expiration time.

17. The RFID tag of claim 16 where the display, calculator and count-down timer are passively powered.

* * * * *